United States Patent
Cho et al.

(10) Patent No.: US 10,071,726 B2
(45) Date of Patent: Sep. 11, 2018

(54) SHIFTING CONTROL METHOD FOR HYBRID VEHICLES

(71) Applicant: Hyundai Motor Company, Seoul (KR)

(72) Inventors: Sung Hyun Cho, Yongin-si (KR); Ju Hyun Nam, Bucheon-si (KR); Seong Hwan Cheong, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 143 days.

(21) Appl. No.: 15/334,098

(22) Filed: Oct. 25, 2016

(65) Prior Publication Data

US 2018/0015915 A1    Jan. 18, 2018

(30) Foreign Application Priority Data

Jul. 14, 2016 (KR) .................. 10-2016-0089006

(51) Int. Cl.
| | |
|---|---|
| *B60W 10/02* | (2006.01) |
| *B60W 10/08* | (2006.01) |
| *B60W 10/113* | (2012.01) |
| *B60W 20/15* | (2016.01) |
| *B60W 30/19* | (2012.01) |

(52) U.S. Cl.
CPC ............ *B60W 20/15* (2016.01); *B60W 10/02* (2013.01); *B60W 10/08* (2013.01); *B60W 10/113* (2013.01); *B60W 30/19* (2013.01); B60W 2510/0241 (2013.01); B60W 2510/081 (2013.01); B60W 2510/1015 (2013.01); B60W 2520/10 (2013.01); B60W 2550/142 (2013.01); B60W 2710/021 (2013.01); B60W 2710/081 (2013.01); B60W 2710/083 (2013.01); B60W 2710/1005 (2013.01); Y10S 903/93 (2013.01); Y10S 903/945 (2013.01); Y10S 903/946 (2013.01)

(58) Field of Classification Search
CPC .... B60W 10/113; B60W 10/02; B60W 10/08; B60W 2550/142; B60W 30/19; B60W 2520/10; Y10S 903/945; Y10S 903/946
See application file for complete search history.

(56) References Cited

U.S. PATENT DOCUMENTS

2017/0361830 A1* 12/2017 Cho .................. B60W 20/10

FOREIGN PATENT DOCUMENTS

| JP | 2013213537 A | 10/2013 | |
|---|---|---|---|
| JP | 2015117826 A * | 6/2015 | .......... F16H 61/061 |
| JP | 2015-160462 A | 9/2015 | |
| KR | 10-2012-0031612 A | 4/2012 | |
| KR | 10-2014-0077352 A | 6/2014 | |
| KR | 20150071119 A | 6/2015 | |
| WO | WO2015141285 A1 | 9/2015 | |

* cited by examiner

*Primary Examiner* — Sherry Lynn Estremsky
(74) *Attorney, Agent, or Firm* — Morgan, Lewis & Bockius LLP

(57) ABSTRACT

A shifting control method for hybrid vehicles may include shifting request determining, by a controller, of determining whether power off down shifting to a lowest stage is requested, clutch releasing, by the controller, of controlling a release clutch to be released, when it is determined that a gradient of a road exceeds a reference value and a vehicle speed exceeds a reference vehicle speed when the shifting is requested as the shifting request determination result, synchronizing, by the controller, of controlling a motor speed to be synchronized with an applying input shaft speed, and clutch engaging, by the controller, of controlling an applying clutch to be engaged.

7 Claims, 2 Drawing Sheets

SHIFTING CONTROL METHOD FOR HYBRID VEHICLES

CROSS REFERENCE TO RELATED APPLICATION

The present application claims priority to Korean Patent Application No. 10-2016-0089006, filed Jul. 14, 2016, the entire contents of which is incorporated herein for all purposes by this reference.

BACKGROUND OF THE INVENTION

Field of the Invention

The present invention relates to a shifting control method for hybrid vehicles capable of implementing quick and stable shifting by dualizing a shifting control strategy depending on a gradient and a vehicle speed upon the shifting to a lowest stage.

Description of Related Art

In connection with a determination of a shift stage of a transmission, an optimal shift stage for transferring a driving force required for a vehicle to wheels of the vehicle depending on a road state or a driving state of the vehicle is determined, thereby performing shifting when the shifting is required. That is, a vehicle overcomes a gradient resistance and is shifted by reflecting a driver's will.

This is determined as a shifting pattern reflecting various road states and a driver's will of a vehicle. A shifting pattern of an HEV system is also determined by the same principle and a shifting pattern for generating a driving force that a driver requires is set.

Since the HEV system charges a battery using braking of a vehicle by regenerative braking until the vehicle stops, the HEV system directly connects a motor to wheels until the vehicle completely stops without releasing a clutch at an appropriate time to perform a control to continuously transfer a braking force of the motor to the wheels, thereby maximizing improvement in fuel efficiency.

However, when the shifting is made before a vehicle stop having a very low vehicle speed, shifting stability may be reduced depending on a road state of a vehicle, and therefore a shifting control strategy needs to be changed.

For example, under the situation that power off downshifting is made from a second stage to a first stage, most of the vehicle speed is an extremely low vehicle speed of about 2 to 3 KPH, and therefore a difference between a release input shaft speed for forming the second stage and an applying input shaft speed for forming the first stage is small.

Therefore, there is no room to perform an inertia phase, and therefore only a torque phase is performed and the corresponding shifting ends.

Further, since the gradient resistance of the vehicle is small at a flat land or a downhill road, a vehicle substantially stops at a 2-stage gear ratio and is changed to a 1-stage gear ratio immediately before the vehicle stops. In this case, even though a vehicle is in a tip-in during a deceleration of a vehicle, a driving force required for the tip-in is relatively low, and therefore the shifting may be made under the situation that the vehicle is about to stop.

By the way, to prepare for the tip-in during the deceleration of the vehicle at an inclined road having a large gradient resistance, the 1-stage gear ratio is required at a relatively high vehicle speed.

For this reason, the inertia phase required interval is relatively long while the difference between the release input shaft speed in which the second stage is already formed and the applying input shaft speed for forming the first stage is relatively large. In this case, if the inertia phase is not performed and only the torque phase is performed, there is a problem in that the shifting shock occurs while the applying clutch is excessively engaged.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a shifting control method for hybrid vehicles capable of implementing quick and stable shifting by dualizing a shifting control strategy depending on a gradient and a vehicle speed upon the shifting to a lowest stage According to various aspects of the present invention, a shifting control method for hybrid vehicles may include a shifting request determining step of, by a controller, of determining whether power off down shifting to a lowest stage is requested, a clutch releasing step of, by the controller, controlling a release clutch to be released, when it is determined that a gradient of a road exceeds a reference value and a vehicle speed exceeds a reference vehicle speed when the shifting is requested as the shifting request determination result, a synchronizing step of, by the controller, controlling a motor speed to be synchronized with an applying input shaft speed, and a clutch engaging step of, by the controller, controlling an applying clutch to be engaged.

In the clutch releasing, a motor torque may be controlled to be 0 Nm while the release clutch is released.

A target shift gear provided at an applying input shaft may be engaged prior to the synchronizing, and in the synchronizing, the motor torque may be controlled based on a change in slip amounts of the applying input shaft speed and the motor speed to synchronize the motor speed with the applying input shaft speed.

The synchronizing step may include motor torque determining, of determining a motor torque for a motor control by a function of a difference between the applying input shaft speed and the motor speed to a difference between the applying input shaft speed and a release input shaft speed and a motor rotational inertia, and synchronous determining step, of determining whether an absolute value of the difference between the motor speed and the applying input shaft speed according to the motor control is less than a reference value.

The shifting control method for hybrid vehicles may further include a motor torque reducing step of, by the controller, controlling a motor torque to be reduced to 0 Nm while maintaining the release clutch in an engaged state, when it is determined that the gradient of the road is equal to or less than the reference value or the vehicle speed is equal to or less than a reference vehicle speed when the shifting is requested as the shifting request determination result, and a torque handover step of, by the controller, releasing the release clutch while engaging the applying clutch.

In the motor torque reducing step, a release clutch torque for maintaining the release clutch in the engaged state may be determined by an addition of a transmission input torque and a predetermined torque value.

The shifting control method for hybrid vehicles may further include shifting complete determining step, by the controller, of engaging a target shift gear provided at the applying input shaft prior to the torque handover, step and determining, by the controller, whether torque handover shifting exceeds a set torque phase target time, after the torque handover step.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
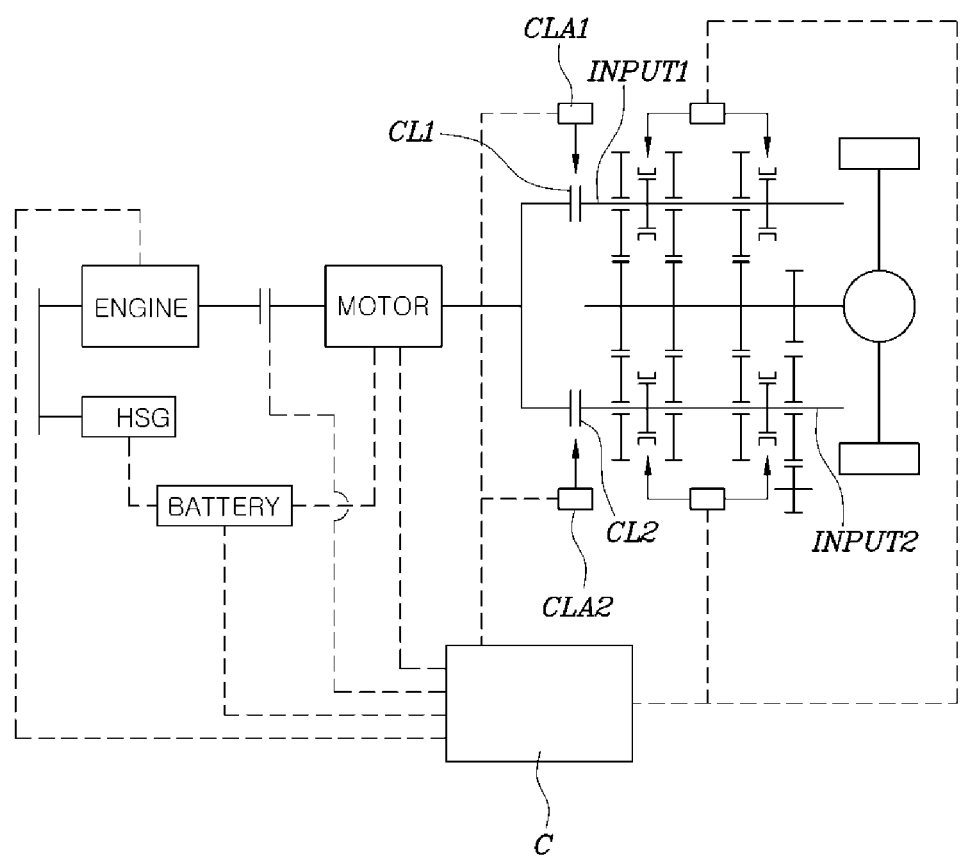
FIG. 1 is a diagram schematically illustrating an overall configuration of a hybrid Dual Clutch Transmission (DCT) vehicle to which various embodiments of the present invention may be applied.

Various embodiments of the present invention may be applied to a hybrid vehicle in which a Dual Clutch Transmission (DCT) is equipped as illustrated in FIG. 1. Referring to FIG. 1, two clutches configuring the DCT, i.e., an applying clutch and a release clutch are each represented by reference numerals CL1 and CL2, an applying clutch actuator and a release clutch actuator for engaging and releasing the CL1 and CL2 are each represented by reference numerals CLA1 and CLA2, and an applying input shaft and a release input shaft are each represented by reference numerals INPUT1 and INPUT2.

However, this is only for convenience of understanding of various embodiments of the present invention. Therefore, the applying and the release may be interchanged depending on what a clutch for forming a current shift stage and a clutch for forming a target shift stage are.

Meanwhile, the shifting control method for hybrid vehicles according to various embodiments of the present invention is configured to include a shifting request determining step, a clutch releasing step, a synchronizing step, and a clutch engaging step.

Figure 2:
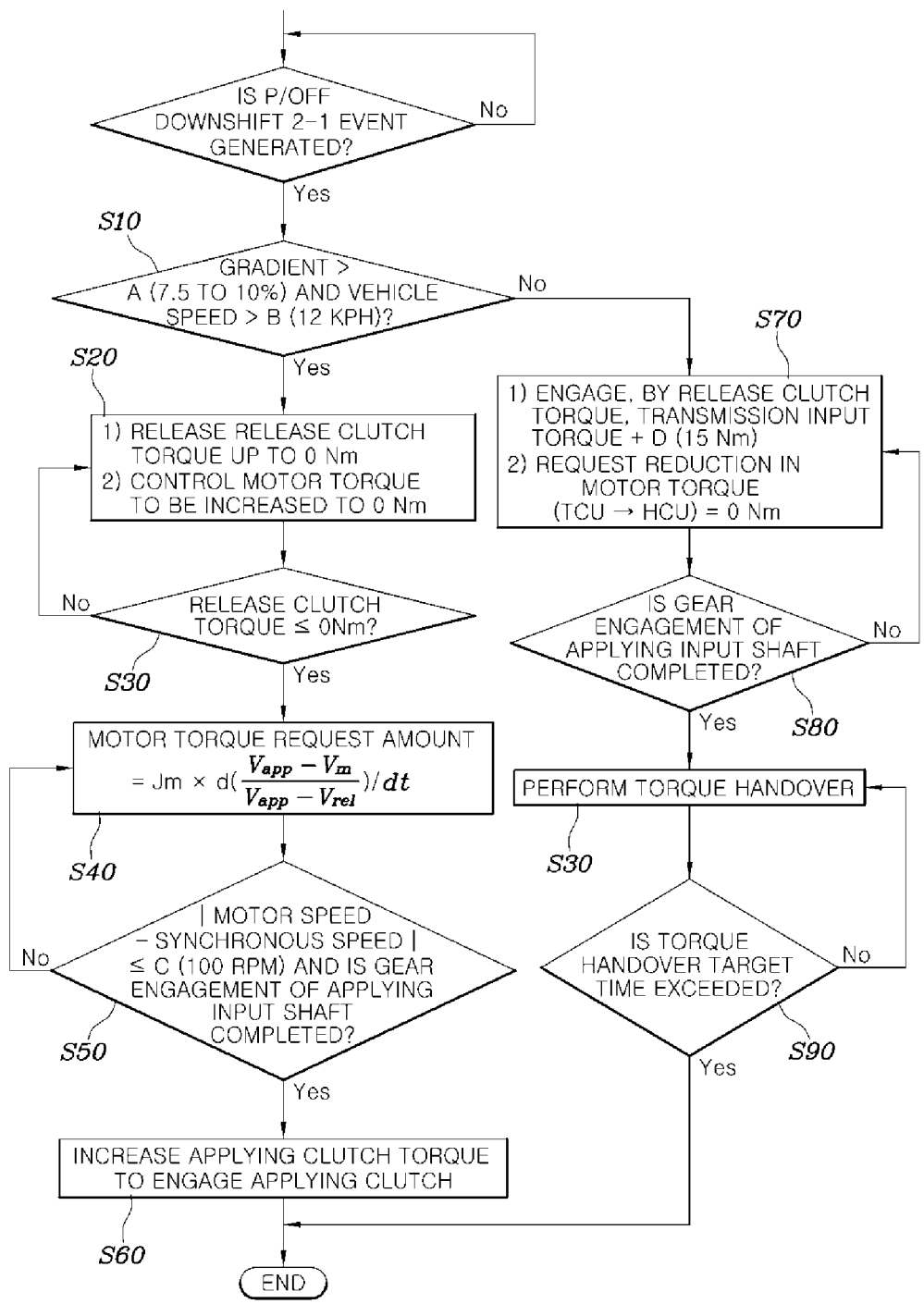
FIG. 2 is a diagram for describing a flow of a shifting control process according to various embodiments of the present invention.

Describing in detail various embodiments of the present invention with reference to FIGS. 1 and 2, first of all, in the shifting request determining step, a controller C may determine whether power off down shifting to a lowest stage is requested.

For example, it is determined whether a shifting event for entering the down-shifting from a second stage to a first stage in the state in which an accelerator pedal is not pressed according to the set shifting pattern is generated.

In the clutch releasing step, as the determination result of the shifting request determining step, when the corresponding shifting request is generated, the controller C determines a gradient of a road and a vehicle speed. In this case, the gradient may be secured based on an inclination sensor that is equipped in a vehicle.

For example, when the gradient of the road exceeds a reference value and the vehicle speed exceeds a reference vehicle speed, a release clutch torque is gradually controlled to reach 0 Nm at a predetermined slope and thus the release clutch CL2 is released.

In the synchronizing step, the controller C may control a motor speed to be synchronized with an applying input shaft speed.

In this case, a target shift gear connected to the applying input shaft, that is, a 1-stage gear may be in the engaged state by a synchronizer.

In the clutch engaging step, the controller C controls the applying clutch torque to be gradually increased at the predetermined slope to thereby engage the applying clutch CL1. In this case, the applying clutch torque is increased up to an input torque input to a transmission through the motor to thereby minimize a slip occurrence of the applying clutch CL1, such that the power off down-shifting from the second stage to the first stage may be completed.

That is, as described above, according to various embodiments of the present invention, when the shifting from the second stage to the first stage is made at a relatively higher vehicle speed due to a high inclination of an uphill road, a synchronization with a target shift stage is made by a motor control in the state in which the release clutch CL2 is released, and then the shifting is made. Therefore, upon a tip-in during the shifting from the second stage to the first stage, the shifting is quickly made by quickly generating a driving force required for 1-stage starting and the shifting is stably made at a high gradient, thereby minimizing a shifting shock.

Further, in the clutch releasing step according to various embodiments of the present invention, a motor torque may be controlled to be increased up to 0 Nm while the release clutch CL2 is released.

That is, the motor torque is controlled to be a (−) torque to perform regenerative braking at least before the release clutch CL2 is released. In this case, the motor torque is controlled to be increased to 0 Nm while the release clutch CL2 is released. Therefore, the motor speed may be controlled to be converged to the speed of the release clutch CL2 while the release clutch CL2 is released, thereby preventing the motor speed from being suddenly changed.

Meanwhile, according to various embodiments of the present invention, the target shift gear provided at the applying input shaft may be engaged before the synchronizing step. For example, a 1-stage shift gear may be engaged.

Further, in the synchronizing step, the motor torque may be controlled based on the change in slip amounts of the applying input shaft speed and the motor speed to synchronize the motor speed with the applying input shaft speed.

Here, the synchronizing step may be configured to include a motor torque determining step and a synchronous determining step.

In detail, in the motor torque determining step, a motor torque request amount for the motor control may be determined by a function of the difference between the applying input shaft speed and the motor speed to the difference between the applying input shaft speed and the release input shaft speed and a motor rotational inertia.

That is, the motor torque request amount may be determined by the following Equation.

$$\text{Motor torque request amount} = Jm \times d\left(\frac{V_{app} - V_m}{V_{app} - V_{rel}}\right) / dt$$

In the above Equation, Jm: Motor rotational inertia, Vapp: Applying input shaft speed, Vrel: Release input shaft speed, and Vm: Motor speed.

Further, in the synchronous determining step, it may be determined whether an absolute value of the difference between the motor speed and the applying input shaft speed is less than a reference value according to the motor control.

For example, when the absolute value of the difference between the motor speed and the applying input shaft speed is less than the reference value, it may be determined that the synchronization is completed.

Further, when it is determined that the synchronization is completed, it is determined whether the 1-stage gear engagement is completed and if it is determined that the 1-stage gear engagement is completed, the foregoing clutch engaging step may be performed.

Meanwhile, various embodiments of the present invention may be configured to include a motor torque reducing step and a torque handover step.

In detail, in the motor torque reducing step, as the determination result in the shifting request determining step, when the corresponding shifting request, that is, the power off down-shifting request from the second stage to the first stage is generated, the controller C determines the gradient of the road and vehicle speed, in which when the gradient of the road is equal to or less than the reference value or the vehicle speed is equal to or less than the reference vehicle speed, the motor torque may be controlled to be 0 Nm while the release clutch CL2 is maintained in the engaged state.

In this case, the release clutch torque for maintaining the release clutch CL2 in the engaged state may be calculated as much as an addition of a transmission input torque and a predetermined torque D Nm. That is, the release clutch torque is applied at applied at a torque larger than the transmission input torque to prevent the slip of the release clutch CL2.

In the torque handover step, the release clutch CL2 may be released while the applying clutch CL1 is engaged. That is, the applying clutch torque is controlled to be a predetermined set target torque to engage the applying clutch CL1, and at the same time the release clutch torque is controlled to be 0 Nm to release the release clutch CL2.

That is, the applying clutch torque is calculated from a torque handover control start time to a torque handover control end time to control the clutch.

For example, the applying clutch torque may calculate the slope based on the following Equation and the applying clutch torque may be controlled based on the calculated slope.

$$\begin{aligned}
\text{Applying clutch Torque}(t) &= \text{Applying clutch Torque}(t-1) + \\
&\quad \text{Auto Ramp to Target}(*) \\
&= \text{Applying clutch Torque}(t-1) + \\
&\quad \{(\text{Applying clutch Target}(**)) - \\
&\quad \text{Applying clutch Torque}(t-1))/ \\
&\quad (\text{Torque Phase Target Time} - \\
&\quad \text{Phase duration time})\}
\end{aligned}$$

In the above Equation, the Applying clutch Target(**)={ (|Transmission input torque|+factor*(Je (except for the case in which the engine clutch is attached, 0)+Jm)*dNm/dt)}

Applying clutch Torque(t-1): Applying clutch torque before torque handover control start time Auto Ramp to Target(*): Applying clutch torque until applying clutch torque reaches torque handover control end time based on torque handover control start time That is, based on the applying clutch torque at the torque handover control start time, the clutch torque is continuously incremented up to the torque handover control end time to calculate the applying clutch torque having a predetermined slope.

Here, the target shift gear provided at the applying input shaft may be engaged before the torque handover step. That is, the torque handover step is entered in the state in which the 1-stage gear engagement is completed.

Further, various embodiments of the present invention may include a shifting complete determining step of determining whether the torque handover shifting exceeds a set torque phase target time, after the torque handover step.

That is, as described above, when the shifting is made from a second stage to a first stage at a flat land or a downhill road, the motor torque is controlled to be reduced to 0 Nm in the state in which the release clutch CL2 is engaged to prevent the release input shaft speed from being reduced during the torque handover process and maximally reduce the difference between the release input shaft speed and the applying input shaft speed. Therefore, the shifting may be stably made without the shifting shock by performing only the torque phase, without performing the inertia phase.

Hereinafter, the shifting control flow for the hybrid vehicles according to various embodiments of the present invention will be described.

When the power off down-shifting event from the second stage to the first stage during traveling of a vehicle is generated, it is determined whether the gradient of the current road exceeds A, and whether the vehicle speed exceeds B (S10).

As the determination result, when the gradient exceeds A and the vehicle speed exceeds B, the motor torque is controlled to be increased to 0 Nm while the release clutch torque is released up to 0 Nm at a predetermined slope.

Next, it is determined whether the release clutch CL2 is completely released (S30) and as the determination result, if it is determined that the release clutch CL2 is completely released, the motor torque request amount is calculated to synchronize the motor speed with the applying input shaft speed (S40).

Further, the motor control is performed depending on the calculated motor torque request amount to determine whether an absolute value of the difference between the motor speed and the synchronous speed (applying input shaft speed) reaches C to achieve the synchronization. In this process, it is determined whether the engagement of the 1-stage gear provided at the applying input shaft is completed (S50).

As the determination result, when the synchronization is completed and the 1-stage gear engagement is completed, the applying clutch torque is increased at a predetermined slope and thus the applying clutch CL1 is engaged (S60), and therefore the corresponding shifting is completed.

As described above, according to various embodiments of the present invention, when the shifting from the second stage to the first stage is made at the relatively higher vehicle speed due to the high inclination of the uphill road, the synchronization with the target shift stage is made by the motor control in the state in which the release clutch CL2 is released, and then the shifting is made, such that when the vehicle is tipped-in during the shifting from the second stage to the first stage, the driving force required for the 1-stage starting is quickly generated to perform the quick shifting and perform the stable shifting at the high gradient, thereby minimizing the shifting shock.

Meanwhile, as the determination result of the step S10, when the gradient is equal to or less than A or the vehicle speed is equal to or less than B, the release clutch torque is applied as much as the addition of the transmission input torque and the predetermined torque DNm and thus the release clutch CL2 is maintained in the engaged state. At the same time, the motor torque is controlled to be reduced to 0 Nm (S70).

Next, it is determined whether the 1-stage gear engagement is completed (S80) and as the determination result, when the 1-stage gear engagement is completed, the torque handover is performed to engage the 1-stage gear while releasing the 2-stage gear (S90).

In this case, it is determined whether the torque handover target time of the step S90 exceeds and as the determination result, when the target time exceeds, the torque handover ends, and thus the corresponding shifting is completed.

As described above, according to various embodiments of the present invention, when the shifting is made from a second stage to a first stage at a flat land or a downhill road, the motor torque is controlled to be reduced to 0 Nm in the state in which the release clutch CL2 is engaged to prevent the release input shaft speed from being reduced during the torque handover process and maximally reduce the difference between the release input shaft speed and the applying input shaft speed, such that the shifting may be stably made without the shifting shock by performing only the torque phase.

According to various embodiments of the present invention, when the shifting from the second stage to the first stage is made at the relatively higher vehicle speed due to the high gradient, the shifting is made after the synchronization by the motor control, and thus the driving force required for the first stage starting is quickly generated when the vehicle is in the tip-in during the shifting to perform the quick shifting and the stable shifting at the high gradient, thereby minimizing the shifting shock.

Further, when the shifting is made from the second stage to the first stage at the flat land or the downhill road, the difference between the release input shaft speed and the applying input shaft speed is reduced maximally by the motor control, and as a result the shifting may stably be performed without the shifting shock by performing only the torque phase.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shifting control method for hybrid vehicles, comprising:
    a shifting request determining step of, by a controller, determining whether power off down shifting to a lowest stage is requested;
    a clutch releasing step of, by the controller, controlling a release clutch to be released, when it is determined that a gradient of a road exceeds a reference value and a vehicle speed exceeds a reference vehicle speed when the shifting is requested as the shifting request determination result;
    a synchronizing step of, by the controller, controlling a motor speed to be synchronized with an applying input shaft speed; and
    a clutch engaging step of, by the controller, controlling an applying clutch to be engaged.

2. The shifting control method for hybrid vehicles of claim 1, wherein in the clutch releasing step, a motor torque is controlled to be 0 Nm while the release clutch is released.

3. The shifting control method for hybrid vehicles of claim 1, wherein:
    a target shift gear provided at an applying input shaft is engaged prior to the synchronizing step; and
    in the synchronizing step, the motor torque is controlled based on a change in slip amounts of the applying input shaft speed and the motor speed to synchronize the motor speed with the applying input shaft speed.

4. The shifting control method for hybrid vehicles of claim 3, wherein the synchronizing step includes:
    a motor torque determining step of determining a motor torque for a motor control by a function of a difference between the applying input shaft speed and the motor speed to a difference between the applying input shaft speed and a release input shaft speed and a motor rotational inertia; and
    a synchronous determining step of determining whether an absolute value of the difference between the motor speed and the applying input shaft speed according to the motor control is less than a reference value.

5. The shifting control method for hybrid vehicles of claim 1, further comprising:
- a motor torque reducing step of, by the controller, controlling a motor torque to be reduced to 0 Nm while maintaining the release clutch in an engaged state, when it is determined that the gradient of the road is equal to or less than the reference value or the vehicle speed is equal to or less than a reference vehicle speed when the shifting is requested as the shifting request determination result; and
- a torque handover step of, by the controller, releasing the release clutch while engaging the applying clutch.

6. The shifting control method for hybrid vehicles of claim 5, wherein in the motor torque reducing step, a release clutch torque for maintaining the release clutch in the engaged state is determined by an addition of a transmission input torque and a predetermined torque value.

7. The shifting control method for hybrid vehicles of claim 5, further comprising:
- a shifting complete determining step of, by the controller, engaging a target shift gear provided at the applying input shaft prior to the torque handover step; and
- determining, by the controller, whether torque handover shifting exceeds a set torque phase target time, after the torque handover step.

* * * * *